(12) United States Patent
Ceccaldi

(10) Patent No.: US 6,607,592 B1
(45) Date of Patent: Aug. 19, 2003

(54) ANTISHRINKAGE AGENT FOR CONCRETE OR MORTAR

(75) Inventor: Jean-Dominique Ceccaldi, Dieulefit (FR)

(73) Assignee: Vicat, Paris la Defense Cedex (FR)

( * ) Notice: Subject to any disclaimer, the term of this patent is extended or adjusted under 35 U.S.C. 154(b) by 0 days.

(21) Appl. No.: 09/674,296

(22) PCT Filed: May 20, 1999

(86) PCT No.: PCT/FR99/01204

§ 371 (c)(1),
(2), (4) Date: Oct. 31, 2000

(87) PCT Pub. No.: WO99/59934

PCT Pub. Date: Nov. 25, 1999

(30) Foreign Application Priority Data

May 20, 1998 (FR) .............................................. 98 06506

(51) Int. Cl.$^7$ ......................... C04B 24/00; C04B 24/02; C04B 7/00; C04B 7/02
(52) U.S. Cl. ....................... 106/732; 106/735; 106/772; 106/775; 106/776; 106/819; 106/823
(58) Field of Search ................................ 106/772, 775, 106/732, 735, 776, 819, 823

(56) References Cited

U.S. PATENT DOCUMENTS

| 2,307,741 A | * | 1/1943 | Goldstein et al. | ............ 106/724 |
| 3,663,251 A | * | 5/1972 | Moren et al. | ................ 106/725 |
| 3,857,714 A | * | 12/1974 | Mehta | .......................... 106/735 |
| 4,547,223 A | * | 10/1985 | Goto et al. | .................. 106/700 |

FOREIGN PATENT DOCUMENTS

| EP | 0 643 022 A1 | 3/1995 |
| WO | WO 96 27565 | 9/1996 |

OTHER PUBLICATIONS

XP–002092043, Database WPI, Jul. 7, 1989, abstract.
XP–002092044, Database WPI, Apr. 21, 1989, abstract.
XP–002113162, Database WPI, May 24, 1978, abstract.

* cited by examiner

Primary Examiner—Elizabeth D. Wood
(74) Attorney, Agent, or Firm—Oliff & Berridge, PLC

(57) ABSTRACT

The invention concerns a composition in dry state for mortar or concrete, comprising a cement and an antishrinkage agent. The invention is characterized in that the antishrinkage agent consist of a calcium sulphate, particularly an anhydrous calcium sulphate, associated with at least a glycol ether.

12 Claims, No Drawings

ANTISHRINKAGE AGENT FOR CONCRETE OR MORTAR

The present invention relates to an antishrinkage admixture for concrete or mortar.

To compensate for the shrinkage of a concrete or mortar, it is customary to use an expansive process, namely a micronized aluminum powder, a calcium carbide, a quicklime, hydrogen peroxide, a calcium aluminosulfate or an iron powder is mixed with the mortar or concrete composition in the dry state.

The swelling obtained is about 300 to 800 microns per meter at 28 days. Since the shrinkage of mortar or concrete in the cured state is of the same order, for example 600 microns per meter for a 28-day standardized mortar, an antishrinkage effect is normally obtained.

In theory, the shrinkage is therefore well compensated for but, in reality, it is very difficult to control this expansion and the moment when it occurs.

Likewise, to limit the shrinkage it is possible to use various admixtures of the fatty acid type, polyalkylene glycol ethers, etc., which do not produce swelling but make it possible to limit the shrinkage by acting on the surface tension of the water in the pores of the hydrated cement. This type of admixture, although reducing the short-term (28 day) shrinkage, produces in reality very limited results in the longer term (>90 days).

According to document JP-A-01-172 252, a hardening admixture for concrete or mortar is described, which comprises:

- a gypsum, namely a dehydrated calcium sulfate, or anhydrite, namely an anhydrous calcium sulfate;
- triethanolamine or diethylene glycol; and
- an hydroxylated carboxylic acid; or a salt of lignin and sulfonic acid.

In such a hardening admixture, the gypsum or anhydrite makes it possible to regularize the setting time of the cement into which said hardening admixture is incorporated.

As regards triethanolamine or diethylene glycol, their surfactant properties make it possible in some cases to improve the mechanical strength of certain concretes or mortars.

The Applicant has discovered novel antishrinkage admixtures having the ability to create specific microstructures in the cured concrete or mortar, with a greater reproducibility and reliability, with the various types of cement encountered in the market.

Surprisingly, it has been found that a calcium sulfate, and more particularly an anhydrous calcium sulfate, combined with at least one glycol ether makes it possible to obtain such a microstructure and is suitable as an antishrinkage admixture.

Without the Applicant being bound, as regards the interpretation of the claims or the assessment of the present invention, by the hypotheses or explanations given below, its understanding of the latter is as follows.

Calcium sulfate in contact with any reactive alumina present in a cement normally forms with water, quantitatively and by being expanded, ettringite crystals having a different nature to that of the conventional hydrates in cement in that they are particularly sensitive to variations in relative humidity and to subsequent inflows of water.

When calcium sulfate and, in particular, anhydrite are combined with at least one glycol ether, they reduce the internal hydraulic tensions which cause the concrete or mortar to shrink. This action modifies the microstructure of the latter, namely the texture of the assembly of the hydrated crystals formed without modifying the nature of the latter. The cured concrete or mortar finally obtained therefore has virtually all the properties conventionally obtained with a cement, with a minimum or negligible shrinkage, and is virtually insensitive to variations in humidity or to subsequent inflows of water.

Compared with other chemically similar products, such as an oxyalkylene alkyl ether or an alkylene diol, the associated glycol ethers according to the present invention are distinguished by the fact that they do not contain functional groups capable of degrading by internal hydrolysis, during hydration of the cement, and therefore of interfering with the action of the calcium sulfate/glycol ether combination on the hydraulic tensions.

It is the specific hydration texture obtained according to the present invention which gives the mortar or cement obtained sufficiently high compressive strength properties (15 to 20 MPa at 28 days), sufficiently high flexural strength properties (3 to 5 MPa at 28 days) and sufficiently low elastic modulus properties (15,000 MPa at 28 days), and this being so with a minimum shrinkage. This makes it possible, if required, for the cured concrete or mortar obtained to absorb, without any prejudicial deformation, residual stresses whose intensity may be of the order of one-tenth of the flexural strength at the end of 28 days.

By way of example, 30 kg of a mixture of calcium sulfate and glycol ethers is used per 1 $m^3$ of mortar in the fluid state, added to 450 kg of CPJ/CEM II A –32.5 R Portland cement with 1500 kg of sand and 200 liters of water.

The structure obtained with such a mortar in the cured state is stable and nonshrinking, and its mechanical performance is satisfactory.

The application of a nonshrinking mortar or concrete for the construction of pavements, screeds or other applications in the building industry in general, and in the field of roads, airports, etc., in which splitting joints and anticracking meshes are thus avoided, may be appreciated.

The antishrinkage admixtures according to the invention are very suitable for bedding mortars or grouts and for floor leveling coats, adhesives and mortars.

Another field of use in which the nonshrinking and the noncracking are highly advantageous is the production of impermeable mortars or concretes: building foundations, underground car parks, water tanks, swimming pools, nuclear power stations.

In the flooring field, the Applicant has developed, using the same antishrinkage admixture, various compositions for self-leveling mortars or concretes. In this case, it is necessary to add a water-reducing admixture of the naphthalene sulfonate, lignosulfonate or sulfonated melamine type, or any other type of water-reducing admixture that can be used with hydraulic binders, an antisedimentation, stabilizing, thickening admixture of the methyl cellulose, biopolymer, fly ash or stabilized casein type, an air-entraining agent of the sodium abietate type, or any other additive that can be used with hydraulic binders.

This list is not exhaustive; by way of additive, it is possible to add accelerators, retarders, adhesion promoters, antifoaming admixtures, etc.

By way of example, it being understood that the following proportions may vary, 160 g of an air-entraining agent of the sodium abietate type, 3000 g of a water-reducing admixture of the naphthalene sulfonate type and 50 g of an antifoaming admixture of the silicone type were added to the mortar in the fluid state exemplified above.

The mortar thus obtained can be pumped and it spreads by itself. It suffices to respect the levels to be attained and to stir the mix for outgassing it.

The screed thus manufactured provides the same ease of installation as an anhydrite-type self-leveling screed, but with less water sensitivity (possibility of pouring outdoors, resistance to moisture rise), for the bonding of tiling in very short times.

With an antishrinkage admixture according to the invention, there is no risk of forming ettringite-type swelling salts at the screed/tiling or screed/concrete base interface without the need for primary-type courses for isolating the adhesive from the anhydrite base or the anhydrite screed from the concrete base.

The present invention also relates to the following alternative embodiments with regard to the mortar or concrete composition in the dry state:

- the composition comprises fibers, for example metal, plastic, especially polypropylene or polyester, glass or carbon fibers;
- preferably, the cement is of the Portland type;
- in the composition, the calcium sulfate represents at most 10% and preferably between 3 and 5% by weight of the cement; above 10%, depending on the composition of the cement, ettringite, varying as regards its texture, is liable to form,
- in the composition, the glycol ether represents between 0.5 and 3% by weight of the calcium sulfate;
- the composition furthermore includes an additive chosen from the group consisting of water-reducing admixtures, antisedimentation admixtures, stabilizers, air-entraining agents and antifoaming admixtures.

The invention also relates to a concrete in the fluid state, capable of being obtained by mixing a composition as defined above with an aggregate or a sand.

The invention also relates to a mortar in the fluid state, capable of being obtained by mixing a composition as defined above with sand.

Finally, the invention relates to a structure capable of being obtained by employing and curing a concrete or a mortar as defined above, using a suitable technique such as molding, wall-forming or shuttering.

What is claimed is:

1. A cement composition in the dry state, comprising a cement and an anti-shrinkage agent consisting of a combination of an anhydrous calcium sulfate and at least one glycol ether.

2. Composition according to claim 1, further comprising fibers.

3. Composition according to claim 1, wherein the cement is of the Portland type.

4. Composition according to claim 1, wherein the calcium sulfate represents at most 10% by weight of the cement.

5. Composition according to claim 1, wherein the glycol ether represents between 0.5% and 3% by weight of the calcium sulfate.

6. Composition according to claim 1, further comprising an additive selected from the group consisting of antisedimentation admixtures, stabilizers, air-entraining agents and antifoaming admixtures.

7. Composition according to claim 2, wherein the fibers are metal and/or plastic fibers.

8. Composition according to claim 2, wherein the fibers are selected from the group consisting of polypropylene, polyester, glass and carbon fibers.

9. Composition according to claim 4, wherein the calcium sulfate represents between 3 and 5% by weight of the cement.

10. A concrete in the fluid state, obtained by mixing the cement composition of claim 1 with an aggregate and water.

11. A mortar in the fluid state, obtained by mixing the cement composition of claim 1 with sand and water.

12. A cement anti-shrinkage agent comprising a combination consisting of anhydrous calcium sulfate and at least a glycol-ether.

* * * * *